April 24, 1956 L. MAUTNER ET AL 2,743,363

PULSE OSCILLATORS

Filed May 11, 1950

INVENTORS
LEONARD MAUTNER
and
RICHARD C. PALMER
BY
Darby & Darby
Attorneys

United States Patent Office 2,743,363

Patented Apr. 24, 1956

2,743,363

PULSE OSCILLATORS

Leonard Mautner, Rutherford, and Richard C. Palmer, Nutley, N. J., assignors to Allen B. Du Mont Laboratories, Inc., Clifton, N. J., a corporation of Delaware Application May 11, 1950, Serial No. 161,444

3 Claims. (Cl. 250—36)

Figures 1, 2, 3:
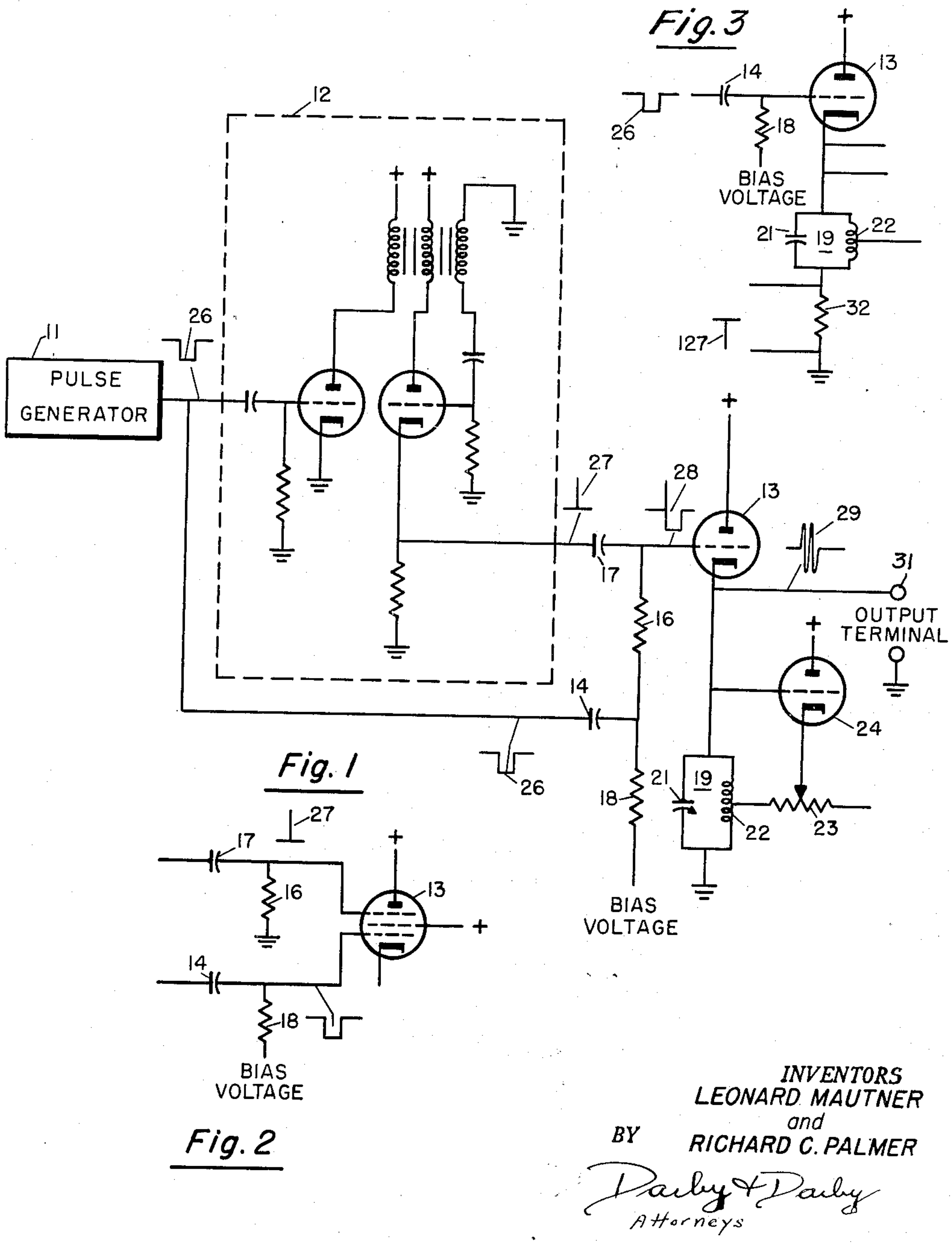

This invention relates to electrical oscillation generators and more particularly to pulsed oscillation generators.

In pulsed signal systems such as radar and the like sinusoidal voltage waves are generated in an oscillating, or ringing, circuit wherein a control pulse starts and stops the ringing. Either of two types of ringing circuits have been used, the first of which comprises a vacuum tube having a parallel tuned circuit in series with its plate-cathode circuit. The tube, which is normally conducting, is keyed off in order to start the oscillations and allowed to resume conduction in order to stop the oscillations. The resonant frequency of the tuned circuit determines the frequency of the oscillations. Such a circuit is used when the effect of the natural decay of the amplitude of the oscillations is not important. The second type of ringing circuit comprises the same elements as the first and, in addition, a feedback circuit to maintain the amplitude of the oscillations at a fixed level.

It is an object of this invention to provide an improved pulsed oscillator.

A second object is to provide a more stable pulsed oscillator.

A third object is to provide a pulsed oscillator useable at high frequencies.

A fourth object is to provide an oscillator capable of generating oscillations having a higher output voltage than has heretofore been possible with a given keying tube.

Other objects will be apparent from the following specification and drawings in which:

Fig. 1 is a schematic diagram of a pulsed oscillator in accordance with the invention; and Figs. 2 and 3 show modifications.

The amplitude of the initial voltage oscillation is given by the expression $$e=i_L\sqrt{\frac{L}{C}}$$

where $i_L$ is the direct current through the inductance preceding the pulse, the peak voltage heretofore obtainable from a given tube having been limited by the D. C. plate dissipation of the tube. The frequency of the oscillations, which is determined by the equation $$f=\frac{1}{2\pi\sqrt{LC}}$$

has been limited in practice by the value of the inherent capacity across the inductance. This is particularly true of the second type of circuit in which the feedback is preferably adjusted so that the amplitude of all succeeding oscillations will be equal to the amplitude of the first. If an increase in frequency is desired, it is necessary to reduce either the inductance or the capacity, and it is obvious from the first equation that, in order to maintain the highest possible amplitude of oscillations, the capacity should be reduced. However, when this capacity has been reduced to the value of the stray capacity, it is necessary to reduce the inductance. As the circuit is tuned for higher frequencies, the amplitude of the initial oscillation drops off, and it is necessary to reduce the feedback so that subsequent oscillations will not exceed the first. There is a point at which the feedback is so small as to be unstable, and beyond this point heretofore it has been considered necessary to use complicated circuits to achieve the desired, keyed oscillations.

Referring to Figure 1, a pulse generator 11 of any well known type generates pulses of electrical energy having a square wave form in negative polarity and predetermined duration amplitude and repetition rate. This pulse generator 11 is connected to a second pulse generator 12 which generates relatively sharp pulses of limited duration. This second pulse generator 12 may be, for instance, a blocking oscillator circuit to produce sharp "spikes" of voltage and will be referred to herein as a spike generator. The initial negative going portion of the output from pulse generator 11 triggers the spike generator 12.

The pulse generator 11 also is connected to the grid of a thermionic triode tube 13 through a condenser 14 and resistor 16.

The spike generator 12 also is connected to this grid of tube 13 through a condenser 17. A resistor 18 is connected from the junction of the condenser 14 and resistor 16 to a suitable source of bias voltage.

A tuned circuit 19 comprising a condenser 21 in parallel with an inductance 22 is connected in the cathode to ground circuit of tube 13. A second thermionic triode tube 24 is connected across a portion of this tuned circuit 19. The grid of tube 24 is connected to the cathode of tube 13. The cathode of tube 24 is connected through a variable tapped resistance 23 to a tap on inductance 22. The plates of the tubes 13 and 24 are connected to a suitable source of voltage. The output from the circuit is taken from the cathode of tube 13.

In the operation of the circuit the pulse generator 11 generates negative pulses of the type indicated by reference character 26 which are applied to tube 13 by means of the R—C coupling circuit consisting of condenser 14 and resistor 18. The leading edges of the pulses 26 are used to trigger the spike voltage generator 12 which generates short, sharp, spike voltage impulses designated by reference character 27. The duration of these spike voltage impulses is generally, but not necessarily, less than 1/10 the total period. Although pulse generator 11 is used to synchronize the spike generator 12 in the embodiment shown, these two components may be reversed so that the spike generator 12 synchronizes the pulse generator 11. The spikes 27 of voltage are applied to the grid of tube 13 through condenser 17 and appear across the serially connected resistors 16 and 18. These positive voltage spikes 27 are added to the negative pulses 26 applied across resistor 18 through condenser 14 to form a composite wave 28 in which the positive spike is synchronous with the leading edge of the negative pulse. The mixing circuit composed of resistors 16 and 18 is one example of a circuit to perform the function of combining spike voltage impulses 27 and the negative, rectangular pulses 26. Other mixing arrangements to obtain the desired result include, for example, the use of a multigrid tube in place of the triode 13 as illustrated in Figure 2. The pulses 26 may be applied to one grid and the spike voltage impulses 27 to another grid. Still another arrangement for mixing the pulse voltage 26 and the spike 27 is shown in Figure 3 in which an inverted spike 127, similar in other respects to the spike 27, is inserted into the cathode circuit across the resistor 32, which should preferably have a low resistance. This way of applying the spike voltage to the tube 13 complies with the essential idea that the current supplied to the tuned circuit 19 must be increased and then stopped in order to start the oscillations of the tuned circuit 19 at a high amplitude, and it does not matter whether the current is increased by raising the grid potential or lowering the cathode potential. This fact applies as well to the pulse 26; i. e., it may be inverted and applied across resistor 32 the same as the spike 127.

Normally tube 13 is biased so that a current which will not exceed the tube characteristic limitations flows through the tube and through inductance 22 to ground. The negative pulse portion of wave 28 preferably has sufficient magnitude to cut off the plate current of tube 13 and keep it cut off for the duration of the pulse. The resultant cessation of the current flow feeding inductance 22 causes tuned circuit 19 to oscillate according to well known transient phenomena. The amplitude of these oscillations may be calculated from the equation $$e=i_p\sqrt{\frac{L}{C}}$$

where $i_p$ is the plate current flowing immediately preceding the negative pulse portion of wave 28. This current is the peak current due to the positive spike portion of wave 28 and may be very much higher than the steady-state plate current flowing through inductance 22.

The current $i_p$ may be much greater than the steady-state current since it flows for such a short interval of time that the average dissipation does not exceed the specified amount for a given tube. It is not necessary that the full amount of current $i_p$ flow through inductance 22; if the rate of rise of the spike portion of wave 28 is too high, a portion of the increasing current will act to charge condenser 17. The magnitude of $i_p$ flowing for the duration of the positive spike also determines the magnitude of the negative portion of wave 28 since the peak voltage $e$ in the above equation must not be greater than the sum of the negative pulse portion of the wave 28, plus the bias voltage, plus the cutoff voltage of the tube.

An additional advantage obtained by the spike portion of wave 28 derives from the grid current drawn by tube 13 during the spike period. This grid current flows through the condenser 17 charging it so that the grid side of the condenser 17 acquires a negative charge. As a result at the termination of the spike portion of wave 28, the grid of tube 13 is automatically driven negative aiding the negative pulse portion of wave 28 in cutting off the plate current through tube 13. This makes it possible to use pulses 26 which do not have an exceedingly sharp leading edge and which are consequently easier to obtain.

Tuned circuit 19 and tube 24 are connected in a Hartley oscillator circuit so that, once started, the oscillations of tuned circuit 19 will be maintained by the feedback action. The variable resistor 23 is adjusted to maintain the amplitude of all the oscillations at the same level as the first. At the end of the negative portion of wave 28, tube 13 resumes conduction, which has the effect of applying a low impedance across tuned circuit 19, thus stopping the oscillations almost immediately. The burst of oscillations resulting from the complete action of the circuit is indicated by reference character 29 as it appears at the output terminal 31.

Although this invention has been described with reference to a particular embodiment, it will be obvious to those skilled in the art that modifications may be made within the spirit of the invention so that we do not desire to be limited except by the following claims.

What is claimed is:

1. An oscillation generator comprising a first source of first voltage pulses, a second source of second voltage pulses, each one of said second pulses having a substantially shorter duration than each one of said first pulses and being timed to coincide with the beginning of each of said first pulses, a mixing circuit to mix said pulses in respective opposite polarities, an electron discharge device having an input circuit and a plate circuit, a tuned circuit connected in series with said plate circuit, said tuned circuit being supplied with energy by means of the plate current of said electron discharge device and oscillatory only when said discharge device is non-conductive, said mixing circuit being connected to said input circuit of said electron discharge device to supply the resultant mixed pulses thereto in such a polarity that each of said second pulses momentarily increases the plate current of said electron discharge device from the moderately conductive value at which said discharge device rests between the end of each of said first pulses and the beginning of the succeeding one of said second pulses, and each of said first pulses cuts off said plate current, thereby starting oscillations in said tuned circuit, and a second electron discharge device connected to said first device to maintain the amplitude of said oscillations constant for the duration of said first pulses.

2. An oscillation generator comprising a vacuum tube having a plate circuit and a grid circuit, a source of plate current for said tube, means for regeneratively coupling the plate circuit and the grid circuit to cause said tube to oscillate, a second vacuum tube having an input circuit and an output circuit, a source of plate current for said second tube, a source of repetitive voltage pulses having a waveform consisting of a positive-going portion of short duration compared with the repetition rate of the pulses, a negative-going portion immediately following said positive-going portion, and an intermediate rest portion, a connection between said source of pulses and said input circuit of said second tube in such a polarity as to cause the plate current of said second tube to be momentarily greatly increased for the duration of the positive-going portion and to be cut off for the duration of the negative-going portion of the pulses and to return to moderate conductivity during said rest portion, and a parallel circuit consisting of a condenser and an inductance forming frequency determining means of the oscillation generator connected across the output of said second tube to allow the parallel circuit to oscillate when the plate current of the second vacuum tube is cut off.

3. An oscillation generator comprising a vacuum tube having a plate, a cathode and a grid, a tuned circuit consisting of an inductance in parallel with a condenser, said tuned circuit being connected between the grid and a source of fixed potential, a tap intermediate the ends of said inductance connected by means of an impedance to the cathode of said tube, a source of positive potential connected to the plate of said tube, a second tube having a plate, a grid, and a cathode connected to the grid of said first named tube, a source of positive potential connected to the plate of said second tube, a source of repetitive voltage pulses having a waveform consisting of a rest portion, a positive-going voltage excursion having a duration less than 1/10 the total period between pulses, and a negative-going voltage excursion having a magnitude greater than the magnitude of the voltage necessary to cut off the plate current of said second tube, a connection between said source of pulses and the grid of said second tube to apply said pulses in such a polarity as to cause the plate current of said second tube to be momentarily greatly increased during the positive-going voltage excursion and to cease during the negative-going voltage excursion of each of said pulses to cause the tuned circuit to oscillate for the duration of said negative-going voltage excursion of said pulses.

References Cited in the file of this patent

UNITED STATES PATENTS

| | | |
|---|---|---|
| 2,244,003 | Eaglesfield | June 3, 1941 |
| 2,364,756 | Roberts | Dec. 12, 1944 |
| 2,443,619 | Hopper | June 22, 1948 |
| 2,464,259 | Proskauer | Mar. 15, 1949 |
| 2,495,115 | Mayer | Jan. 17, 1950 |
| 2,499,413 | Proskauer et al. | Mar. 7, 1950 |
| 2,536,816 | Krumhansl et al. | Jan. 2, 1951 |
| 2,554,308 | Miller | May 12, 1951 |
| 2,573,446 | Ingalls | Oct. 30, 1951 |